March 2, 1965    N. L. W. POSSE    3,171,184
CLAMP
Filed Oct. 21, 1963

Inventor
Nils Lage Wilhelm Posse
By Richard Low
Agt

3,171,184
CLAMP
Nils Lage Wilhelm Posse, 22 Nyodlarvagen,
Sollentuna, Sweden
Filed Oct. 21, 1963, Ser. No. 317,594
Claims priority, application Germany, Oct. 30, 1962,
P 20,698
2 Claims. (Cl. 24—248)

This invention relates to a clamp, especially to one to be used for clamping soft tubes, such as umbilical cords. Yet, the clamp of the invention can also be used for holding work, binding together objects, for instance, wedging a part against another to form a unit, as well as for other purposes.

The primary object of my invention is to provide a clamp which is simple in construction and inexpensive to manufacture.

Another object of the invention is to provide a clamp which can easily be operated. The invention aims at doing away with screws, cams, springs, levers, or the like, so far ordinarily used to actuate clamps or vises.

Other objects of the present invention will become apparent from the following description.

With the objects of the invention in view, I provide a clamp which comprises two members referred to hereinafter as first and second members. The first member has a main portion and two end portions, the main portion being referred to as first main portion, while the two end portions are referred to as first end portions. The first end portions are provided with teeth, are made to be somewhat resilient, and are shaped and adapted to be flexed toward and away from each other. The second member, too, has a main portion and two end portions. The former is called second main portion, and the latter are called second end portions. Each of the second end portions is provided with detentlike means for selectively engaging teeth on said first end portions, and the first and second main portions are adapted to hold an object fast.

Figure 1:
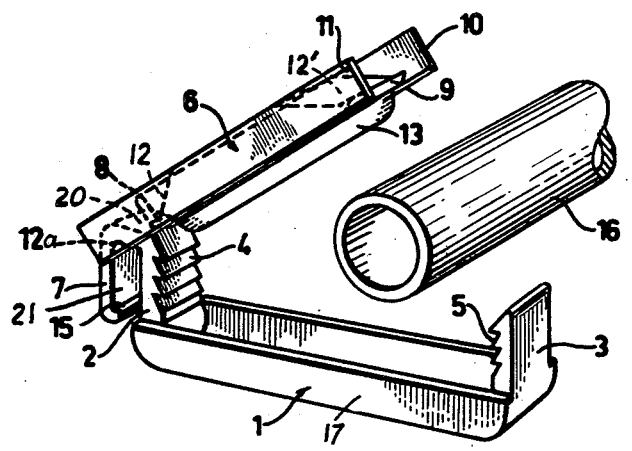
Figure 2:
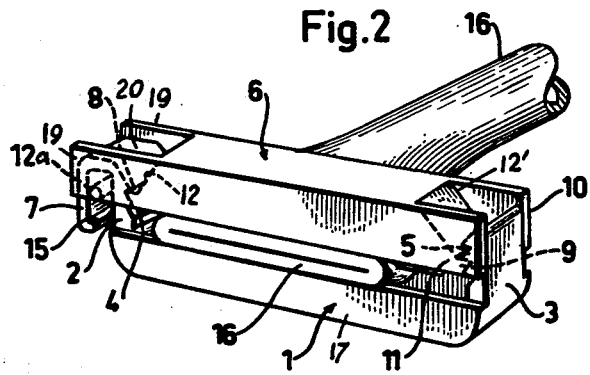

The specification is accompanied by a drawing in which:

FIG. 1 is a perspective view of a clamp embodying features of the invention, also fragmentarily showing a soft and flexible tube; and FIG. 2 is a view showing the same clamp and tube in different conditions.

Referring to the drawing in greater detail now, there are shown two members of which the clamp of the invention consists, these members being designated 1 and 6. Both members are shown to be of an elongated shape. The member 1 or first member has two end portions or first end portions 2 and 3 and a main portion 17 intermediate these end portions, the first main portion. The first end portions 2 and 3 extend away from the longitudinal axis of the first member 1 in the same direction and are made to flex toward and away from each other. They are substantially perpendicular to said longitudinal axis and thus substantially parallel to each other. The faces of the end portions 2, 3, which face each other, are provided with teeth 4, 5. The teeth are formed on each of the end portions in a consecutive sequence. The members 1 and 6 are formed to cooperate with each other. The member 6 or the second member has a second main portion 18 and two second end portions 12, 12'. The second end portions are constituted by inclined surfaces which terminate into a detent 8 and 9, respectively. The second member 6 has at its bottom a raised face 13.

The clamp of FIGS. 1 and 2 is operated as follows: The members 1 and 6 are separate parts. In order to clamp or compress a soft tube 16 which is shown in FIG. 1 in non-compressed condition the tube is placed between the members 1 and 6, while spaced from each other, whereupon the members 1 and 6 are moved toward each other. During this movement, due to the dimensions given the two members, the detents 8 and 9 will engage the outermost teeth of the two series 4 and 5. The detents and teeth are formed so that upon a forced continuation of the movement of either of the members 1 and 6, or of both members, the detents will become disengaged and will engage the next following teeth. This disengagement is made possible by making the first end portions somewhat resilient. The movement of the member or members is continued until the tube is set under sufficient pressure and is deformed as is desired. The deforming action is helped by providing the member 6 with a raised bottom, and by providing at the same time a matingly shaped recess in the member 1. FIG. 2 shows the pressed-together tube.

The two members which form my clamp may according to the invention also be pivoted or hinged together.

In the former case, the two members may be permanently connected with each other by a pivot pin which passes through walls of both members at one end thereof. For this purpose, both members are extended on one side beyond the teeth and the respective detent, so that the pivot point will be a distance outwardly of the teeth and detent engagement. The members are joined in a pincer-like fashion.

For the purpose of hinging the two clamp members together, I provide a hook-and-pintle arrangement which has proven to be most satisfactory. The member 1 is shown to have a hooklike extension. The first end portion 2 has a bent-back extension 7 which is spaced from the end portion 2 and has an inwardly turned edge portion 15. The space defined by the parts 2 and 7, a bridge 20, and the edge portion 15 is designated 21 and is clearly shown in FIG. 1. The member 6 has wall extensions 19, 19 which are used to support a pintle 12a that extends between these wall extensions.

The hinged clamp of my invention functions as follows: The pintle is introduced through the gap between the edge portion 15 and the end portion 2 to be received within the space 21. The gap may be narrower than the diameter of the pintle so that the detachable hinge connection between the two members will be safe. Even with the hinge construction as partly shown in the drawing and described hereinbefore, the members 1 and 6 can be displaced while kept in a parallel relationship. This is due to the fact that the pintle is freely movable within the space 21.

It is believed that the construction and operation of my device, and the many advantages thereof, will be fully understood from the foregoing detailed description. Some of the features of the invention are briefly reviewed hereinafter. While primarily intended for clamping umbilical cords, my clamp is versatile and can be used for various purposes. It is free of screws, springs, cams, and similar motion and power-transmitting parts. The clamp is made of plastics or sheet metal to ensure the needed resiliency. In the case of the hinged construction described, the extension 7 may easily be bent outwardly so that a pintle which otherwise could not enter the space 21 through the normally existing gap may readily enter. To open the closed hinged clamp all that is needed is to bend the end portion 3 outwardly and thus to unlock the two members. The two members of my clamp may be used as separate, permanently connected, or detachably connected parts. When permanently or detachably connected, one of the members may be fixed to a support, in which case the clamp is well suited to holding work and makes holding of the clamp with one's hands unnecessary.

It will be apparent that while I have shown and described my invention in a few forms only, many changes and modifications may be made without departing from the spirit of the invention defined in the following claims.

I claim:
1. A clamp comprising a first member, a second member, and a pintlelike member, said first member having a longitudinal axis, a first main portion, and two first end portions, each of said first end portions being provided with teeth, said first end portions being shaped and adapted to be flexed toward and away from each other, one of said first end portions extending away from said axis and being provided with a bent-back extension, said bent-back extension being spaced from said one first end portion and forming together with said one first end portion a hooklike formation, said second member having a second main portion and two second end portions, each of said second end portions being provided with detent-like means for selectively engaging teeth on said first end portions, said pintlelike member being provided on one of said second end portions for a hinglelike cooperation with said hooklike formation, said first and second main portions being adapted to clamp work between them.

2. In the clamp according to claim 1, said second member having side walls, said pintlelike member extending between and being supported by said side walls.

References Cited by the Examiner

UNITED STATES PATENTS

| 552,217 | 12/95 | Wight | 24—251 |
| 1,241,306 | 9/17 | Thorson | 24—66 |
| 1,444,030 | 2/23 | Leather. | |
| 2,434,831 | 1/48 | Brandenburg | 128—346 X |
| 2,659,371 | 11/53 | Schnee | 128—346 |
| 2,915,267 | 12/59 | Kaysing | 24—263 X |

FOREIGN PATENTS

| 679,938 | 8/39 | Germany. |
| 822,525 | 11/51 | Germany. |

DONLEY A. STOCKING, *Primary Examiner.*